United States Patent
Emprin et al.

(10) Patent No.: US 8,468,796 B2
(45) Date of Patent: Jun. 25, 2013

(54) BY-PASS TURBOJET INCLUDING A THRUST REVERSER

(75) Inventors: Yves Emprin, Melun (FR); Jeremy Edmond Fert, Paris (FR); Jean-Pierre Valentin Wesolowski, Avon (FR)

(73) Assignee: SNECMA, Paris (FR)

( * ) Notice: Subject to any disclaimer, the term of this patent is extended or adjusted under 35 U.S.C. 154(b) by 787 days.

(21) Appl. No.: 12/100,603

(22) Filed: Apr. 10, 2008

(65) Prior Publication Data
US 2008/0250770 A1 Oct. 16, 2008

(30) Foreign Application Priority Data

Apr. 13, 2007 (FR) .................................. 07 54465

(51) Int. Cl.
*F02K 3/02* (2006.01)

(52) U.S. Cl.
USPC ............. 60/226.2; 60/230; 60/231; 60/785; 60/228; 60/226.3; 239/265.27; 239/265.29; 239/265.25; 244/110 B

(58) Field of Classification Search
USPC ............ 60/226.2, 230, 231, 785; 239/265.25, 239/265.27, 265.29; 244/110 B
See application file for complete search history.

(56) References Cited

U.S. PATENT DOCUMENTS

| | | | |
|---|---|---|---|
| 2,874,538 A | 2/1959 | Laucher et al. | |
| 2,938,335 A | 5/1960 | Cook, Jr. | |
| 3,019,600 A | 2/1962 | Peek, Jr. | |
| 3,068,646 A | 12/1962 | Fletcher | |
| 3,614,037 A | 10/1971 | Vdolek | |
| 3,618,323 A | 11/1971 | Needham | |
| 4,073,440 A * | 2/1978 | Hapke | 239/265.29 |
| 4,228,651 A | 10/1980 | Mullins | |
| 5,904,320 A * | 5/1999 | Tindell | 244/110 B |
| 6,679,048 B1 * | 1/2004 | Lee et al. | 60/204 |
| 2006/0288688 A1 * | 12/2006 | Lair | 60/226.2 |

FOREIGN PATENT DOCUMENTS

| | | |
|---|---|---|
| DE | 44 33 759 C1 | 2/1996 |
| EP | 0 515 263 A1 | 11/1992 |
| GB | 777418 | 6/1957 |
| GB | 1199001 | 7/1970 |

* cited by examiner

*Primary Examiner* — Phutthiwat Wongwian
*Assistant Examiner* — Craig Kim
(74) *Attorney, Agent, or Firm* — Oblon, Spivak, McClelland, Maier & Neustadt, L.L.P.

(57) ABSTRACT

A by-pass turbojet including a thrust reverser is disclosed. The thrust reverse includes a deflector device which deflects all or part of the primary stream gas in such a manner that the deflected primary stream gas encounters the secondary stream, thereby reducing the injection speed of the secondary stream in an aft direction, and thus generating the thrust-reversal effect. The secondary stream escapes from the aft end of the nacelle. In the thrust-reversal position, the deflector device is inscribed radially substantially within the section of the primary nozzle cowl at the aft end of the nacelle. Such a thrust reverser is particularly simple in design, inexpensive, and makes it possible to avoid having moving parts present on the outside portion of the nacelle, thus simplifying the design of the turbojet.

19 Claims, 4 Drawing Sheets

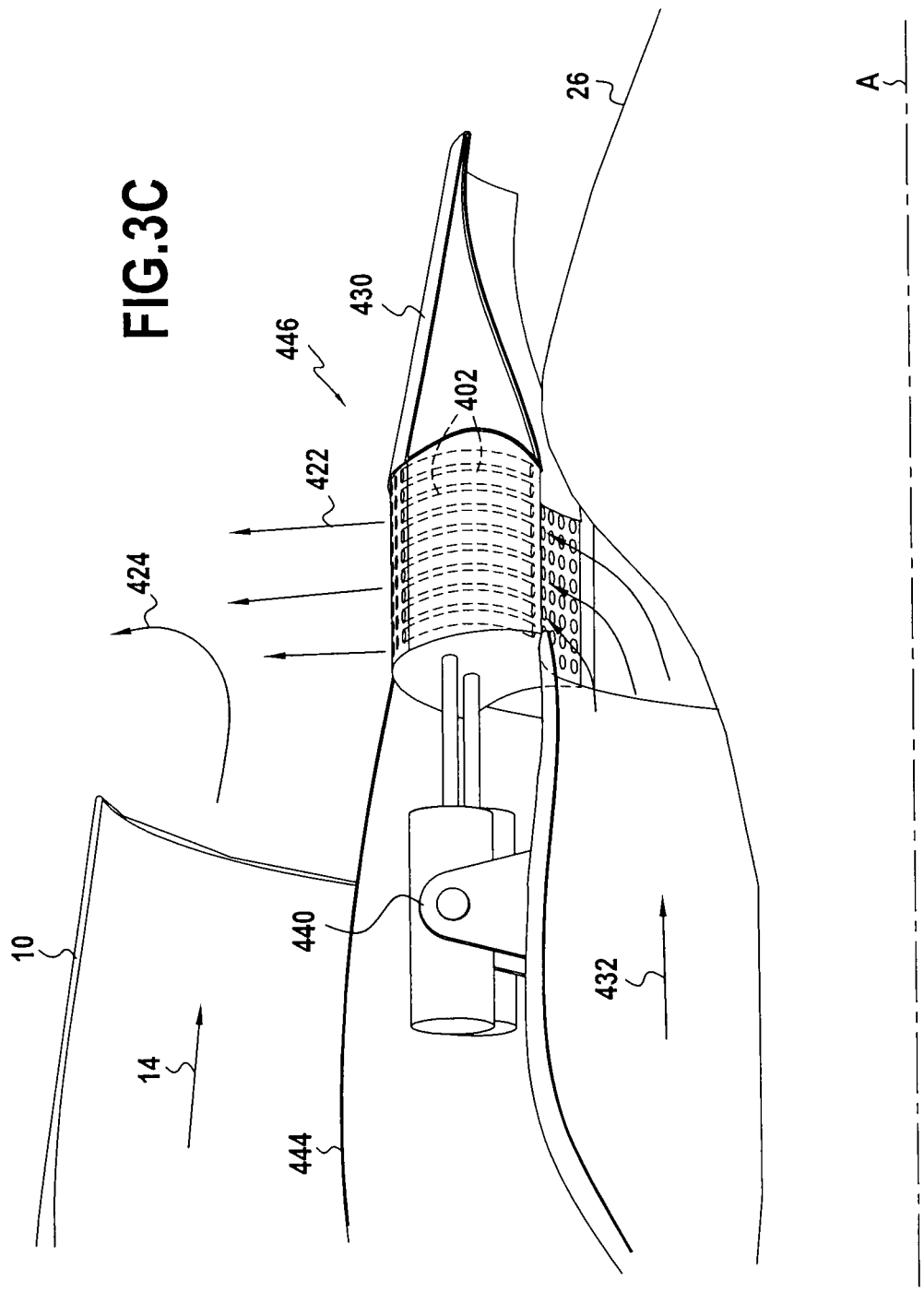

BY-PASS TURBOJET INCLUDING A THRUST REVERSER

The present invention relates to a by-pass turbojet with a primary stream and a secondary stream, and including a thrust reverser.

BACKGROUND OF THE INVENTION

Usually, in the thrust-reversal position, a thrust reverser obstructs at least part of the gas ejection stream in the aft direction, re-directing it towards the sides, or better towards the front of the turbojet, thereby generating reverse thrust that assists the braking provided by the wheels of the airplane. At very least, the thrust reverser reduces the speed of the gas jet stream in the aft direction from the turbojet.

The means implemented to perform this re-direction or at least this reduction in speed of the outgoing stream in the aft direction vary depending on the type of reverser. As a general rule, the architecture of a reverser comprises deflector means that are movable between firstly an open or thrust-reversal position in which the reverser operates and reduces the speed of the outgoing stream in the aft direction, and secondly a retracted or closed or normal position in which the turbojet performs its normal propulsion function.

Two different types of reverser are known.

In reversers using doors, the doors obstruct the secondary stream and divert it towards the front of the airplane.

In a cascade type reverser, sliding doors open the nacelle while also pulling flaps that obstruct the secondary stream.

In another known embodiment, the thrust reverser is formed by an aft portion of the nacelle that is constituted by a moving portion that can move up in order to put itself in a position for reversing thrust and deflecting the secondary stream, or it can return forwards so as to become once more an integral portion of the nacelle, then enabling the turbojet to operate normally (see patent EP 1 416 147).

Those various provisions make use of mechanical structures that are relatively complex and that are generally carried by the nacelle of the turbojet. Such complexity means that the reverser presents significant weight and overall is excessively expensive, given the short length of time (a few seconds) for which it is used compared with the duration of a flight. Furthermore, since the nacelle of a turbojet is the largest-diameter portion thereof, the reverser is necessarily of large dimensions, and consequently features as one of the predominant and highly penalizing elements in the weight budget of the thruster assembly. Its fabrication cost and its utilization cost (associated with its weight) are thus high. Its presence also prevents the size of the nacelle being reduced; the reverser prevents a more aerodynamic nacelle profile being adapted, i.e. it prevents the maximum diameter of the nacelle being reduced, even though that would enable the performance of the turbojet to be improved.

OBJECTS AND SUMMARY OF THE INVENTION

The object of the invention is to remedy the above-mentioned drawbacks by defining a by-pass turbojet defining an axis and forward and aft directions, comprising a nacelle, a primary stream passing through a compressor, a combustion chamber downstream from which the primary stream gas is ejected via a turbine in a primary nozzle cowl; a secondary stream; and a thrust reverser, the reverser being compact in structure, relatively simple, and of limited weight.

This object is achieved by the fact that the thrust reverser comprises deflector means suitable, in a thrust-reversal position, for deflecting all or part of the primary stream gas in the vicinity of or downstream from a aft end of the nacelle; such that in the thrust-reversal position, the deflected primary stream gas encounters the secondary stream, thereby reducing the speed of ejection thereof in the aft direction, and thus generating a reverse-thrust effect, with the secondary stream escaping from the aft of the nacelle; and by the fact that, in the thrust-reversal position, the deflector means are inscribed radially substantially inside the section of the primary nozzle cowl at the aft end of the nacelle.

The originality of the invention can be better understood by comparing a turbojet of the invention with other by-pass turbojets fitted with thrust reversers.

Usually, in order to reverse thrust, action is taken on the secondary stream created by rotation of the fan, which stream is the larger stream and is the stream that generates the most thrust. It is also possible to act on all of the streams exhausted from the turbojet.

Nevertheless, the specific principle used in the turbojet thrust reverser of the invention differs from the principles mentioned above in that it consists in using deflector means to deflect all or part of the primary stream gas and to re-direct it against the secondary stream in order to break the secondary stream and thereby reduce the speed of the outgoing stream in the aft direction. Thus, and advantageously, while acting mechanically only on the primary stream gas, action is taken on all of the streams leaving the turbojet.

The deflected portion of the primary stream gas naturally has its speed in the aft direction reduced because it has been deflected; the secondary stream has its speed in the aft direction reduced because it encounters the deflected primary stream gas.

Naturally, the most advantageous configuration is one in which the outgoing stream is directed perpendicularly to the axis of the turbojet, or indeed towards the front of the turbojet.

The thrust reverser makes use of a fraction of the primary stream gas and is usually situated in the aft portion of the turbojet. In addition, since it acts by deflecting the primary stream gas, it needs to be placed on the path thereof; advantageously, this makes it possible for it to be placed relatively close to the axis of the turbojet, i.e. considerably closer to said axis than would be possible if it were to interact with the secondary stream. It can therefore have a diameter that is relatively small. Advantageously, the diameter of the reverser of the invention is even reduced to such an extent that it is inscribed substantially in the section of the primary nozzle cowl at the aft end of the nacelle. As a result, the mechanical parts of the reverser interact little or not at all with the secondary stream leaving the nacelle. It is the deflected primary stream gas that acts on the secondary stream and not mechanical means of the reverser such as flaps, etc.

Thus, because of its (relatively) small diameter, the reverser remains compact and relatively lightweight.

In contrast, in a conventional thrust reverser, its component elements are generally disposed at least in part in the nacelle. In most configurations, it is these elements that determine the overall size of the nacelle, and thus the master section of the turbojet.

Thus, in contrast, placing the component elements of the thrust reverser in the body of the turbojet provides additional margin for acting on the size of the thruster assembly, and thus for achieving additional savings.

More generally, the above-mentioned characteristics make it possible to adopt a variety of configurations that enable the intended objectives of lightening and simplifying the structure of the turbojet to be achieved by using structures that are significantly more compact than those of known thrust reversers.

In particular, because the deflector means of the thrust reverser are located towards the aft end of the turbojet, during thrust reversal the deflected secondary stream escapes from the aft end of the nacelle. This makes it possible to use a nacelle in which the outer periphery is advantageously made up of parts that are stationary (or that remain stationary at least while the thrust-reversal function is being implemented), without any moving parts.

Advantageously, said deflector means comprise at least one moving structure suitable for moving from a normal or retracted position to a thrust-reversal position in which the moving structure deflects all or part of the primary stream gas.

Said deflector means also comprise actuator means for moving the moving structure from the normal position to the thrust-reversal position, and vice versa. The actuator means may comprise one or more actuators, e.g. hydraulic, kerosene, or electric actuators.

These actuator means preferably include means for providing protection against high temperatures. Since they are situated at the aft of the engine in the vicinity of the combustion chamber they are situated in a zone where temperatures can be high.

The turbojet may also comprise a central body around which the primary stream flows, said moving structure being attached to said central body.

The cone constitutes a central structure on which it is possible to fasten the means for deflecting the primary stream, thereby enabling the thrust-reversal function to be implemented in compact manner.

BRIEF DESCRIPTION OF THE DRAWINGS

The invention can be better understood and its advantages appear better on reading the following detailed description of embodiments shown as non-limiting examples. The description refers to the accompanying drawings, in which:

FIGS. 3A to 3C are detail axial section views in perspective showing the aft portions of two turbojets of the invention, which are variants of the turbojet shown in FIG. 1; in FIGS. 3A and 3B, a turbojet is shown respectively in its normal position and in its thrust-reversal position; in FIG. 3C, another turbojet is shown in its thrust-reversal position.

MORE DETAILED DESCRIPTION

There follows a more detailed description with reference to the accompanying figures of certain embodiments of the invention.

Figure 1:
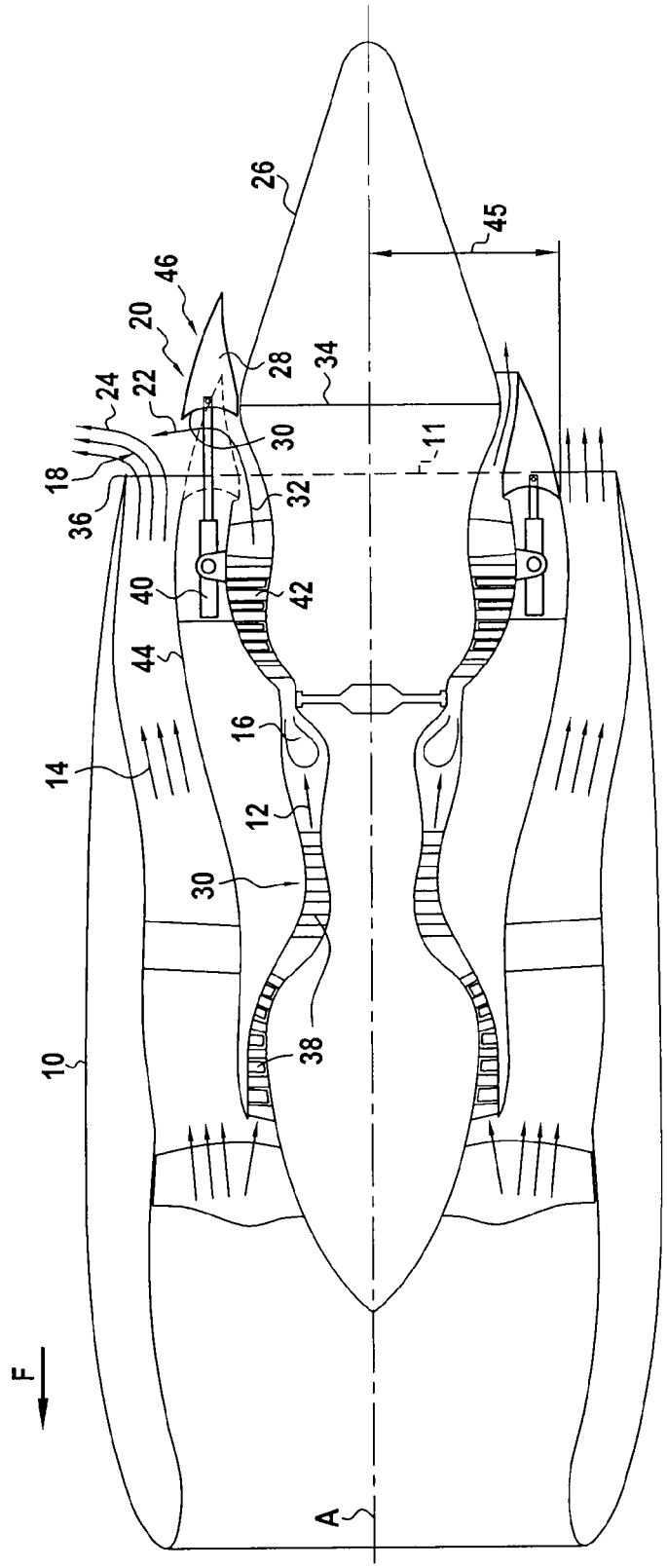
FIG. 1 is an axial section view of a by-pass turbojet in a first embodiment of the invention.

With reference to FIG. 1, a by-pass turbojet of the invention is described. In the upper part of this figure, the thrust reverser is shown in the thrust-reversal position, while in the lower part of the figure, it is shown in normal position.

The by-pass turbojet defines an axis A and forward and aft directions. It comprises a nacelle 10, and has a primary stream 12 that passes through a compressor 38 constituted by a low-pressure compressor followed by a high-pressure compressor, a combustion chamber 16, a turbine 42, prior to being ejected from the aft end thereof in a primary jet stream 32; and also it has a secondary stream 14. The primary and secondary streams are separated by a primary nozzle cowl 44 separating the primary and secondary streams. Furthermore, the turbojet includes a central body 26 around which the primary jet stream 32 flows when the thrust reverser is in the retracted position and the turbojet is performing its normal propulsion function.

This central body 26 presents a greatest-diameter portion (at least for its portion situated aft of the combustion chamber), at a master section 34.

These various turbojet elements are known to the person skilled in the art.

The turbojet shown also has a thrust reverser 18 comprising deflector means 20. These deflector means 20 comprise a set of actuators 40 disposed regularly around the periphery of the cowl 44 of the primary nozzle, and a moving structure 46 actuated by the actuators.

In the embodiment shown in FIG. 1, the moving structure comprises the aft portion of the primary nozzle cowl 44. In the retracted position, the moving structure is in a forward or normal position, i.e. the primary nozzle takes the usual shape of a primary nozzle in a turbojet.

On passing from the normal position to the thrust-reversal position, the moving structure, and more particularly the aft portion of the primary nozzle cowl 44 is moved: it is thrust towards the aft end of the turbojet by the actuators 40.

As can be seen in the top portion of FIG. 1 which shows the thrust-reversal position, the moving structure comprises in particular a set of flaps 30. In the thrust-reversal position, these flaps 30 take on substantially the shape of a ring placed around the central body, or in other words the moving structure in the thrust-reversal position takes on substantially the shape of a ring placed around the central body to deflect all or part of the primary flow gas.

The flaps 30, which are substantially radial, then intersect the primary flow gas to deflect it and direct it against the secondary flow. In addition, the moving structure comprises an aft portion of the primary nozzle cowl that extends the flaps 30 downstream.

The moving structure may also comprise means for channeling the deflected primary stream (not shown in FIG. 1), which means are defined below.

In the thrust-reversal position, the moving structure is thus moved towards the aft end of the turbojet. It is advantageously placed in the vicinity of and substantially around the master section of the central body, which is (at least locally) a maximum-diameter portion of the central body. In this location, the moving structure deflects all or some (depending on the embodiment) of the primary stream gas to follow a direction that is substantially radial. The deflected primary stream gas 22 encounters the secondary stream 14. Because the two streams meet each other, the ejection speed of the secondary stream in the aft direction is reduced, thereby generating the thrust-reversal effect.

Naturally, in other embodiments, some of which are described below, the moving structure could be disposed not in register with the master section, but at some other location along the central body.

The main advantage of the embodiment of FIG. 1 is that the movement of the moving structure when going into the thrust-reversal position is a simple movement in translation. Axial thrust along the axis of the turbojet suffices to cause the moving structure to move into the thrust-reversal position. When, conversely, the pistons of the actuators 40 are retracted, the moving structure is moved towards the front of the turbojet into the retracted position, and the cowl 44 returns to a functional shape that enables the turbojet to operate as a thruster.

The actuators 40 work together to move the moving structure in translation; thus, the deflector means of the thrust reverser remain relatively simple, are of limited weight, and of moderate cost.

In this embodiment, the flaps 30 are optimized as a function of the space available in the primary nozzle cowl 44; they can thus be found to be more or less effective in deflecting the primary stream gas, and thereby deflecting the secondary stream. Nevertheless, if it is necessary to increase the effectiveness of the thrust reverser, it is also possible to adapt and optimize the nacelle so as to increase the space available for the flaps 30. Such a modification can also make it possible advantageously to reduce the master section of the nacelle.

That said, the thrust-reversal effect begins as soon as there is a reduction in the component along the axis of the turbojet of the outgoing streams delivered by the turbojet. Preferably, the secondary stream is deflected and directed at an angle of more than 60° relative to the aft direction, or better still with an angle greater than 90° relative to the aft direction.

Another parameter is the relative length of the nacelle compared with the primary nozzle cowl 44. Preferably, the nacelle needs to be substantially shorter in the aft direction than the cowl so as to leave a passage for the deflected secondary stream 24.

Finally, and advantageously, in a turbojet of the invention, the thrust reverser is remarkably compact. The moving aft structure 46 of the cowl 44 when in the thrust-reversal position lies radially substantially inside the section 45 (FIG. 1) of the primary nozzle cowl 44, this section being measured level with the aft end 11 of the nacelle 10. The major fraction of the secondary stream is not deflected directly or mechanically by the moving structure, but is deflected by the primary stream that is projected against it by the thrust reverser.

Figure 2:
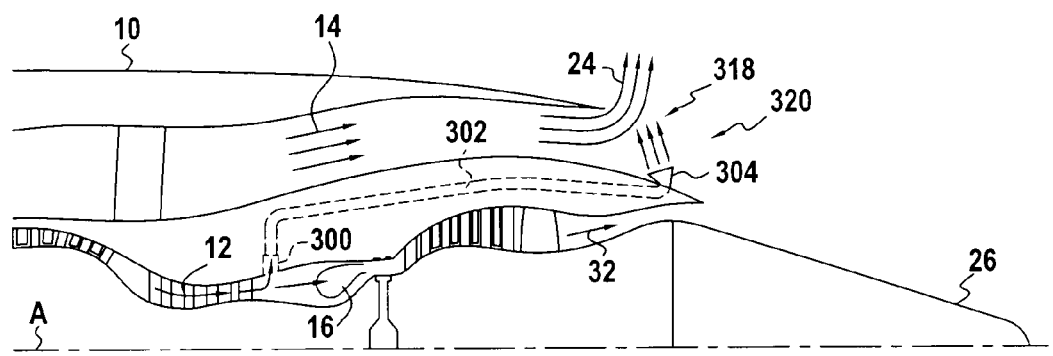
FIG. 2 is an axial section view of the aft portion of a by-pass turbojet in another embodiment of the invention.

With reference to FIG. 2, another embodiment of the invention is described.

In this figure, there can be seen the main structures of a turbojet as described above, such as the nacelle 10, the primary and secondary streams 14 and 13, the combustion chamber 16, and finally the central body 26 around which the primary jet stream 32 flows.

The turbojet also includes a thrust reverser 318, having deflector means 320. These deflector means comprise a bleeder system 300 for bleeding all or part of the primary stream gas, and injectors 304 for injecting the bled gas against the secondary stream. The bleeder system 300 may operate by suction, for example; pipes 302 convey the deflected primary stream to the injectors 304.

The bleeder system serves to bleed a fraction of the gas traveling at high pressure in the primary stream annulus of the engine while the thrust reverser is in use. It can be placed farther upstream or downstream relative to the combustion chamber as a function of the availability of space for receiving it and the desired gas pressure; in addition, if necessary, the deflector means may further comprise one or more moving flaps capable of being deployed in the primary stream gas annulus in order to deflect the gas.

The primary stream gas is deflected under relatively high pressure, which can optionally make it possible to avoid or reduce the need to have recourse to compressors. In addition, since the point from which the primary stream is bled is relatively near to the aft end of the turbojet, the pipe length is short and the thrust reverser remains relatively compact. The deflected gas is taken via a set of pipes 302. It is then reinjected by the injectors 304 so as to create a re-directed primary stream going against the secondary stream. Thus, the secondary stream is deflected, its axial speed in the aft direction is reduced and the thrust-reversal effect is obtained. Furthermore, in the configuration described, the secondary stream deflected by the reinjected primary stream can go past the aft end of the nacelle, thereby avoiding any need for it to have moving parts. Naturally, this type of thrust reverser encourages the use of short nacelles, since that makes it easier to install such a reverser.

Figure 3A:
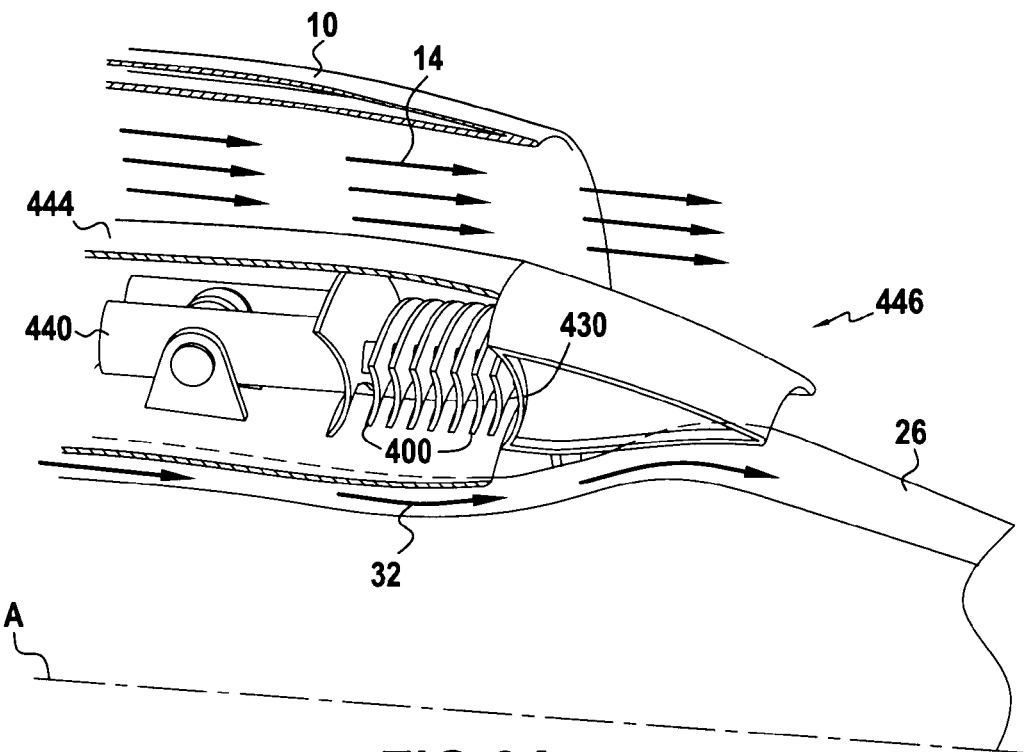
Figure 3B:
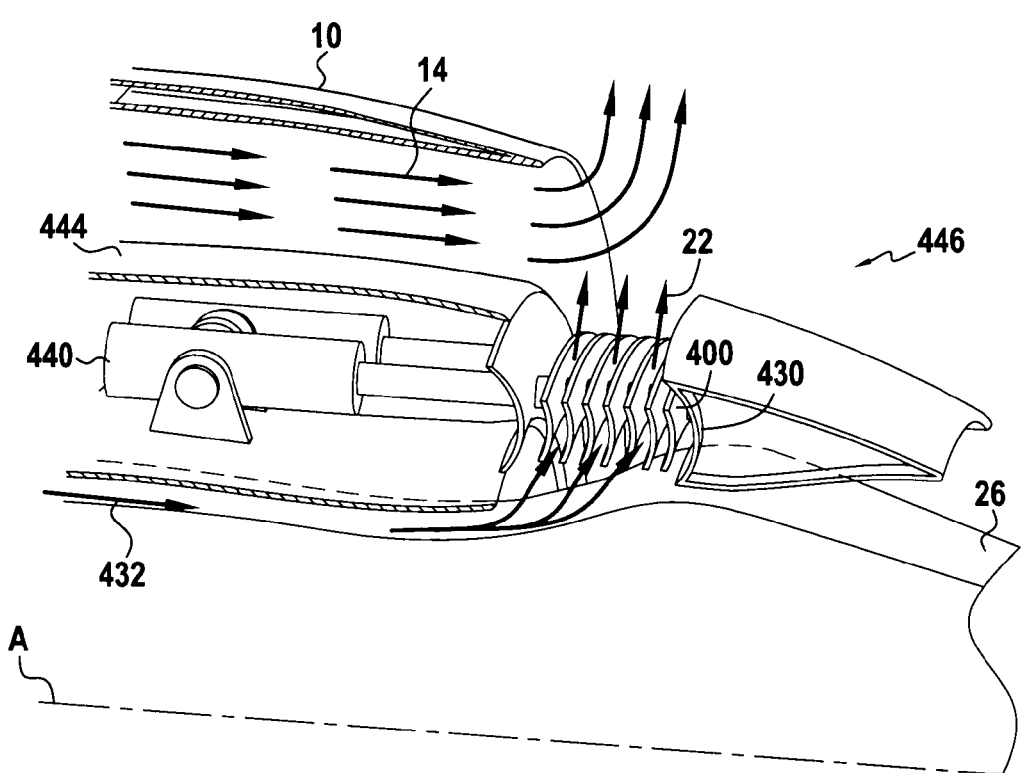

With reference to FIGS. 3A to 3C, another embodiment is described below. The embodiment shown in these figures reproduces the structure of the turbojet described with reference to FIG. 1 and adds an improvement thereto in order to improve the channeling of the deflected primary stream gas, and it is applicable to any turbojet of the invention. This improvement consists in providing means for channeling the deflected stream and for making it more laminar. It is important to conserve a flow that is as laminar as possible in order to reduce air flow power losses and limit fatigue in the mechanical structures.

Two embodiments are described, firstly with reference to FIGS. 3A and 3B, and secondly with reference to FIG. 3C.

In FIGS. 3A and 3B, the deflector means may further include fins 400. These fins extend substantially parallel to the flaps 430 against which the primary stream for deflecting comes into abutment. They enable the flow of the deflected primary stream gas 22 to be made more laminar.

In FIG. 3A, the moving structure is shown in its normal position, stowed inside the primary nozzle cowl 444; it then has no impact on the performance of the engine.

In FIG. 3B, the moving structure is shown in its thrust-reversal position. The flap is then placed substantially in register with the master section of the exhaust cone, thus enabling it advantageously to be situated in continuity with the upstream portion of the central body. The deflected primary stream gas passes between the fins, which then perform their function in full.

The moving structure is moved from the normal or retracted position to the thrust-reversal position, or vice versa, by actuators 440.

In FIG. 3C, the deflector means may further comprise at least one perforated box having one or more perforated plates or walls—two plates in the example shown—constituting grids that are interconnected by numerous internal pipes 402 that convey, channel, and make laminar the deflected stream. Such a perforated box is an alternative to the above-described fins, but both embodiments could nevertheless be used in combination.

What is claimed is:

1. A by-pass turbojet defining an axis and forward and aft directions, comprising:
   a nacelle;
   a primary stream passing through a compressor;
   a combustion chamber downstream from which the primary stream gas is ejected via a turbine in a primary nozzle cowl;
   a secondary stream;
   and a thrust reverser, wherein the thrust reverser comprises deflector means suitable, in a thrust-reversal position, for deflecting all or part of the primary stream gas in the vicinity of or downstream from an aft end of the nacelle; such that in the thrust-reversal position, the deflected primary stream gas encounters the secondary stream, thereby reducing the speed of ejection thereof in the aft direction, and thus generating a reverse-thrust effect, with the deflected secondary stream escaping from the aft of a rear end of the nacelle,
   wherein the aft end of the nacelle is free of a moving part which moves to the thrust-reversal position from a normal operating position, wherein the outer periphery of the nacelle is constituted by parts that are stationary, and wherein in the thrust-reversal position, the deflector means are inscribed radially substantially inside the section of the primary nozzle cowl at the aft end of the nacelle.

2. A turbojet according to claim 1, wherein said deflector means comprise at least one moving structure suitable for moving from the normal position to the thrust-reversal position in which the moving structure deflects all or part of the primary stream gas.

3. A turbojet according to claim 2, wherein axial thrust along the axis of the turbojet serves to cause the moving structure to pass into the thrust-reversal position.

4. A turbojet according to claim 2, further comprising a central body about which the primary stream flows; wherein said central body presents a portion of greatest diameter; and wherein in the thrust-reversal position, the moving structure is positioned substantially around said greatest-diameter portion.

5. A turbojet according to claim 4, wherein the moving structure in the thrust-reversal position is substantially in the form of a ring disposed around said central body to deflect all or part of the primary stream gas.

6. A turbojet according to claim 2, wherein the movement of the moving structure is movement in translation.

7. A turbojet according to claim 2, wherein the moving structure comprises the aft portion of the primary nozzle cowl that moves on passing from the normal position to the thrust-reversal position.

8. A turbojet according to claim 1, wherein the deflector means comprise a bleeder system for bleeding all or part of the primary stream gas, and injectors for injecting the bled gas against the secondary stream.

9. A turbojet according to claim 8, wherein the bleeder system is suitable for bleeding the primary stream gas upstream from the combustion chamber.

10. A turbojet according to claim 9, wherein the bleeder system is suitable for bleeding the primary stream gas downstream from the combustion chamber.

11. A turbojet according to claim 8, wherein the thrust reverser includes one or more moving flaps suitable for being deployed in the primary stream gas annulus in order to deflect the gas.

12. A turbojet according to claim 1, wherein the deflector means include means for providing protection against high temperatures.

13. A turbojet according to claim 1, wherein the deflector means further include fins.

14. A turbojet according to claim 1, wherein the deflector means comprise one or more perforated walls.

15. A turbojet according to claim 1, wherein the deflector means comprise a perforated box.

16. A turbojet according to claim 2, further comprising actuators which actuate the moving structure, the actuators being radially disposed between the primary stream and the secondary stream.

17. A turbojet according to claim 8, wherein the injectors are provided on an aft end of a primary nozzle cowl and the injectors are directed towards the aft of the rear end of the nacelle so as to deflect the secondary stream.

18. A turbojet according to claim 7, wherein the moving structure includes a set of flaps which are substantially radial and in a shape of a ring placed around a central body of the turbojet, the flaps being disposed on an upstream portion of the aft portion of the primary nozzle cowl so as to intersect and deflect all or part of the primary stream in the thrust-reversal position.

19. A turbojet according to claim 18, wherein the deflector means includes a plurality of fins extending substantially parallel to the flaps.

* * * * *